July 11, 1933.  J. M. ROHLFING  1,917,901
APPARATUS FOR WELDING
Filed July 22, 1931   2 Sheets-Sheet 1
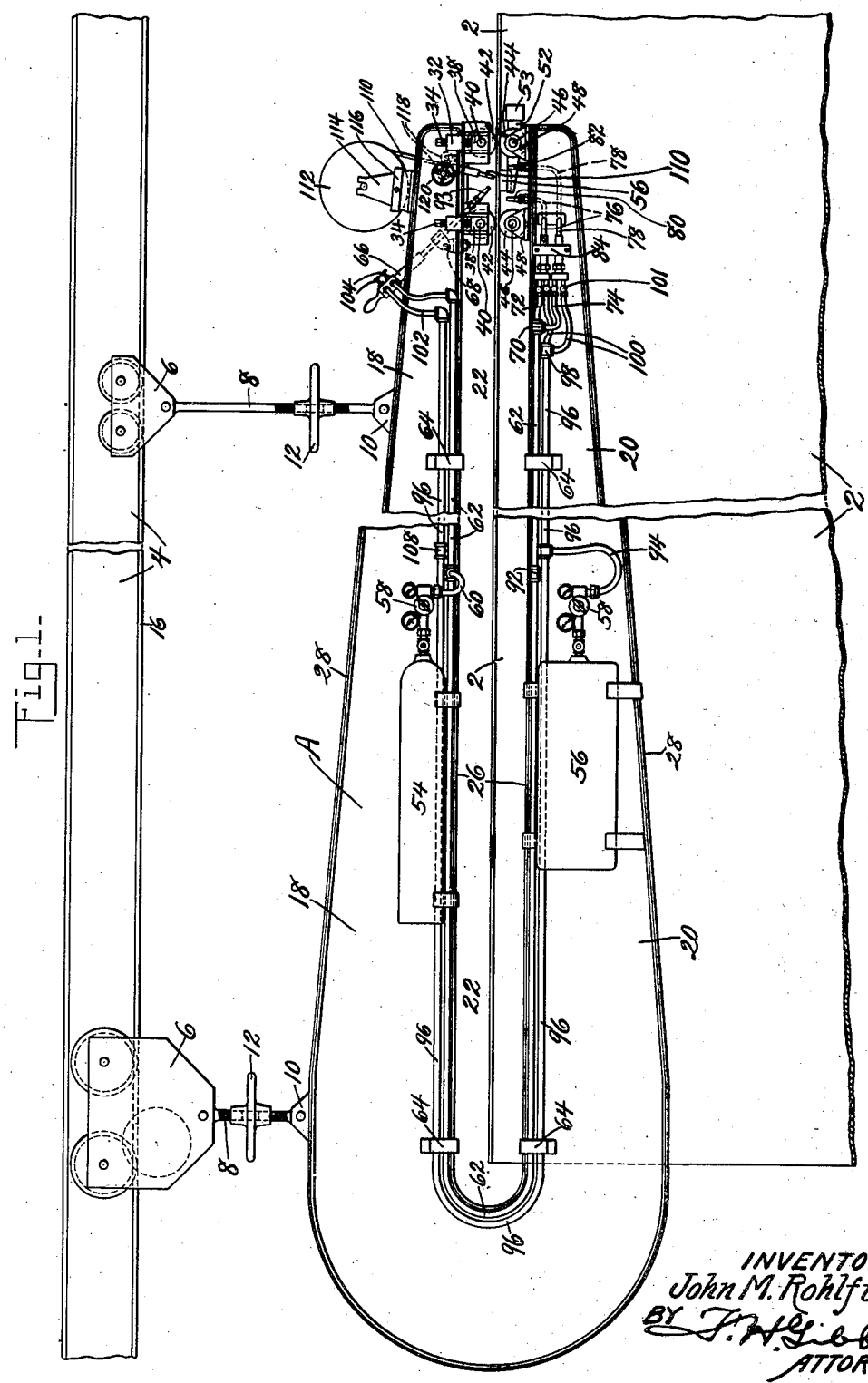

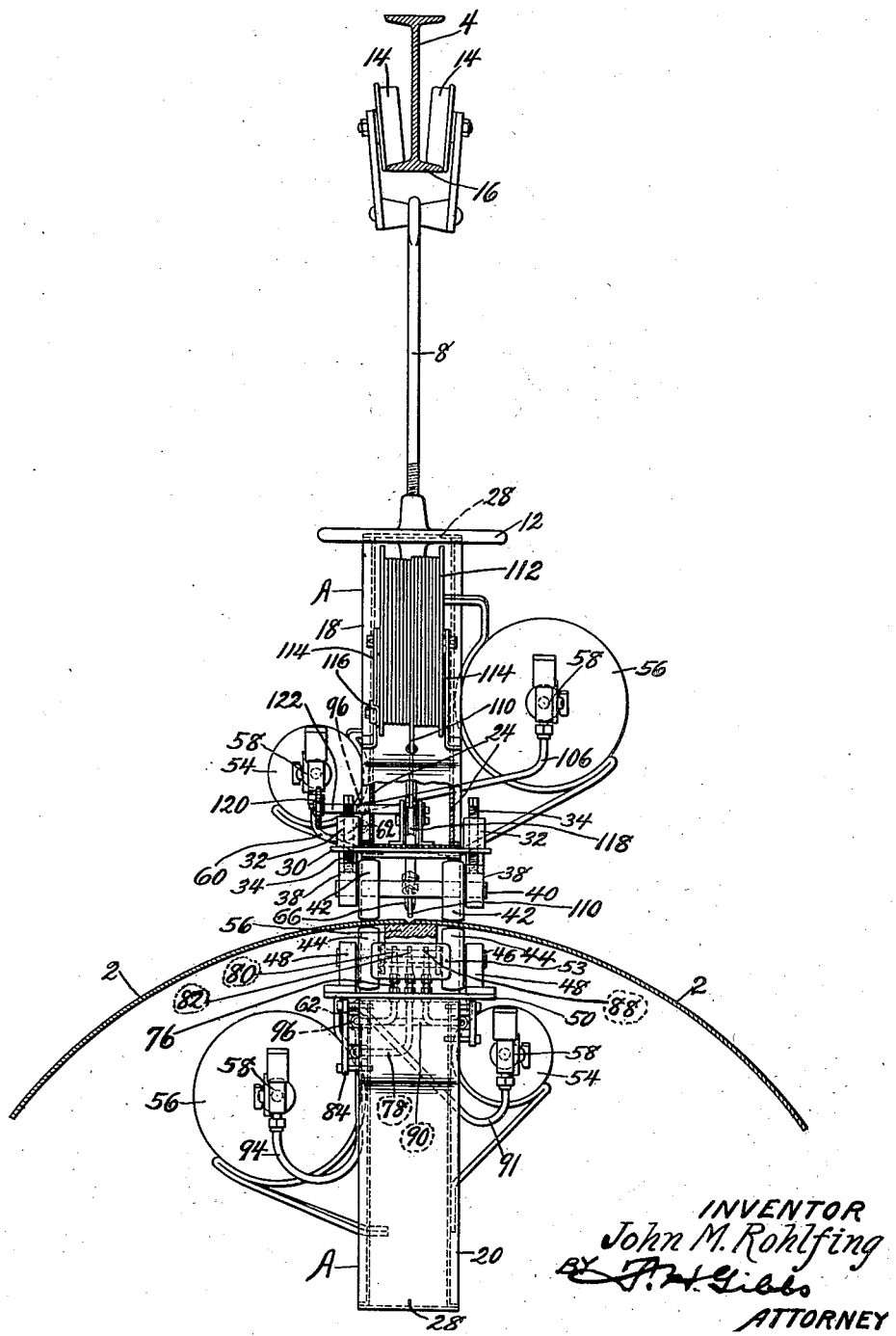

Patented July 11, 1933

1,917,901

UNITED STATES PATENT OFFICE

JOHN M. ROHLFING, OF PLAINFIELD, NEW JERSEY, ASSIGNOR TO AMERICAN CAR AND FOUNDRY COMPANY, OF NEW YORK, N. Y., A CORPORATION OF NEW JERSEY

APPARATUS FOR WELDING

Application filed July 22, 1931. Serial No. 552,341.

This invention relates to welding machines adapted primarily for uniting the edges of adjacent metal sheets such, for example, as sheets for forming the shell of a tank or other metal container.

The invention has been devised particularly for use in connection with the welding of the longitudinal seams of tubular work which is produced from sheets of metal, such as steel, the parallel edges of which are adjacently arranged to permit the deposition of weld metal therebetween to form a union with the edges of the work.

It is well known in welding that unequal expansion of the metal at a joint results in poor welding and distortion and sometimes a breaking down of the joint. This is due to straining of the joint either during the welding or immediately following the welding.

One object of this invention is the provision of a welding machine designed to obviate the disadvantages mentioned above.

Another object of this invention is the provision of a welding machine having means for pre-heating the work prior to the welding thereof whereby to provide substantially uniform expansion of the work at the joint or area to be welded.

Still another object of this invention is the provision of a welding machine having means for pre-heating the work at the joint to be welded prior to welding; said welding machine also having means for annealing the welded joint whereby the gradual cooling of the joint prevents unequal contraction of the metal.

A further object of this invention is the provision of a welding machine having a welding torch adjustably mounted above the work adapted to fuse a weld rod or wire and to heat the upper surface of the work to be welded, and pre-heating torches acting against the under surface of the work at a point in advance of the welding torch for pre-heating the area to be welded, thereby preventing unequal expansion of the metal to minimize and substantially eliminate the unequal strains in the metal which cause distortion of the work after welding; the machine also including an annealing torch adapted to act against the work at the welded joint with a heat of less intensity than that of either the pre-heating torch or the welding torch whereby to effect a gradual or retarded cooling of the welded joint to preserve the integrity of the latter.

A still further object of this invention is the provision of a welding machine which is continuous and automatic in its action and which includes a means for pre-heating the work at the joint to be welded, a welding means immediately following the pre-heating and then an annealing means for the welded joint; the three separate means acting sequentially on the work.

This invention also contemplates the provision of a new and improved method of welding.

As a further object, this invention comprises a new and improved method of forming welded joints for uniting the adjacent edges of metal strips or pieces.

Other objects and advantages of this invention will be apparent from the following description taken in conjunction with the accompanying drawings in which:

Figure 1 is a broken side elevation of the welding machine of the present invention, the view showing in section work applied in position, and Fig. 2 is an end view, partly in section, of the welding machine.

Referring now more particularly to the drawings in which similar characters of reference designate corresponding parts in the several views, the present invention is particularly useful for welding together the adjacent edges of parallel metal sheets 2, which, in the instance shown, are curved and illustrate by way of example portions of the shell of a tank such as a railway car tank.

The machine comprises generally a yoke indicated at A which is suspended from a track 4 by means of trollies 6 having adjustable hangers 8 connected thereto and to the yoke A; brackets 10 being provided on the yoke which engage the lower ends of the hangers 8 and the latter being provided with hand-wheels 12 by which the position of the yoke may be adjusted. The yoke A may be actuated relative to the track 4 either manually or electrically and in the latter case one of the trollies 6 may be electrically driven in any desired manner. As shown in Fig. 2, the trollies include the rollers 14' which cooperate with the lower flanges 16 of the track 4. Obviously, any other desired or preferred construction may be employed for suspending the yoke A from the track.

The yoke A is a unitary construction and comprises the upper and lower jaws 18 and 20, respectively, spaced to provide a gap 22 therebetween, and each jaw includes side walls 24 and inner and outer members 26 and 28, respectively; the construction therefore, being substantially box-shape in section.

Secured to the inner member 26 of jaw 18 adjacent its forward end is a plate 30, the side edges of which project beyond the side walls 24 of the jaw and have secured thereto spaced pairs of upright tapped studs 32 carrying adjusting screws 34 the lower ends of which are connected with bearings 38 arranged below the projecting side edges of the plate 30 and in which spaced axles 40 are journaled. As clearly shown in the drawings, the axles carry rollers 42 which engage the upper surface of the sheets 2 on each side of the meeting or adjacent edges thereof whereby to clamp the sheets or work against spaced pairs of rollers 44 mounted on axles 46 journaled in bearings 48 secured to a supporting plate 50 mounted on the upper surface of the lower jaw 20 adjacent the end thereof.

The outermost axle 46 pivotally supports a lever 52 having a counterweight 53 at one end thereof and an upright refractory block 56' at its opposite end which is adapted to contact with the lower surfaces of the sheets 2 and span the gap between the adjacent edges of said sheets which are to be welded.

From the description thus far it will be obvious that the sheets 2 which are supported from a suitable base (not shown) have their adjacent edges which are to be connected, clampingly held in alinement by the opposed pairs of rollers 42 and 44. Varying thicknesses of sheets 2 may be retained between the rollers because of the adjustable nature of the rollers 42, as will be apparent from an inspection of the drawings, particularly Fig. 2.

While welding of the adjacent edges of sheets 2 may be effected electrically if desired, by use of suitable equipment in connection with the yoke A, the drawings herein illustrate the machine as adapted for oxyacetylene welding and therefore the yoke is provided with means for supporting oxygen and acetylene tanks which are indicated at 54 and 56, respectively. The tanks 54 and 56 are arranged respectively on each side of jaws 18 and 20 but the relative positions thereof on the jaws are reversed as shown clearly in Fig. 2 in order to obtain proper balance. To each of the tanks suitable regulating mechanism 58 including valves is provided which may be of any preferred or desired construction.

The respective oxygen and acetylene tanks are inter-connected for drainage purposes, as will more clearly appear hereinafter, and as appears in Fig. 1 a connector pipe 60 leads from tank 54, being connected to the regulator 58 thereof, to an oxygen conduit 62 supported on the yoke by brackets 64 and having one end connected to a welding torch 66 adjustably mounted on the inner member 26 of jaw 18 by means of a bearing 68. The other end of the oxygen conduit 62 leads to a T 70 and to the latter branch pipes 72 and 74 are secured which lead to a pre-heating torch 76 and an annealing torch 78, respectively; the pre-heating and annealing torches being supported on the lower jaw 20 by suitable means such as the brackets 84. The pre-heating and annealing torches are provided with burners 80 and 82, respectively, which as clearly shown in Fig. 1 are vertically arranged in order to act immediately against the work. A second pre-heating burner 88 is provided which is arranged in such a position as to act against the under surface of the work as shown clearly in Fig. 2; said burner 88 receiving its fuel through a branch pipe 90 leading from the torch 76. The oxygen tank 54 secured to the lower jaw 20 drains into the oxygen conduit 62 through a connector pipe 91 leading from said tank or its regulator 58 through the lower jaw and is connected to the said conduit 62 by a T 92. The two pre-heating burners 80 and 88 provide means for heating each of the sheets 2 at the edges to be welded, as will be obvious. Referring to Fig. 1 it can be seen that the burners 80 and 88 of the pre-heating torch 76 are positioned in advance of the burner 93 of the welding torch 66 whereby to heat the adjacent edges of the sheets 2 prior to welding, while the annealing torch has its burner 82 arranged in such a position as to act against the work subsequent to welding of the joint.

The drawings disclose only one annealing torch but this is merely by way of example as the present invention contemplates means for gradually retarding the cooling of the welded joint whereby to maintain uniform molecular structure in the welded joint and therefore a plurality of annealing torches may be provided if desired. The present invention further contemplates an annealing of a welded joint immediately following the welding and prior to cooling of the joint. The present invention also contemplates the provision of a continuous method for forming welded joints which includes the retarding of the solidification of the joint whereby to effect uniform shrinkage of the material. This is in contradistinction to the usual methods in which, after welding, the material is placed in an annealing furnace and annealed. These prior methods contemplate an appreciable cooling of the welded joint prior to the annealing and in fact the cooling is quite rapid in some instances. The present invention, instead of permitting the welded joint to appreciably cool after welding and prior to annealing, contemplates a welding and a prevention of appreciable cooling and in fact includes the positive retardation in the solidification of the weld, and this has been found to produce a welded joint of a malleable character. The appreciable cooling after welding before annealing, results in cracks and fissures in the joint which are eliminated by the method of the present invention. It may be found desirable to maintain the welded joint at a temperature substantially equal to or slightly less than that required for welding for a certain period and then gradually cool the joint, in which event a plurality of annealing torches may be provided, one or more of which may be adjusted to maintain the welded joint at a temperature substantially equal to or slightly less than welding temperature, as desired, while the others may be adjusted to obtain a progressive retardation in cooling of the joint. It has been found that this annealing of the welded joint prior to cooling, or the gradual or progressive retardation of cooling of the welded joint provides for maintaining uniform molecular structure in the welded joint. This is in contradistinction to any method in which a piece of work is first permitted to rapidly cool and then is subsequently heated and annealed; the initial rapid cooling of the work setting up internal stresses which distort and deform the natural molecular structure of the work.

The acetylene tank 56 on jaw 20 is connected through a connector pipe 94 to an acetylene conduit 96 (see Fig. 1) one end of which is provided with a T 98 and branch pipes 100 leading therefrom to the pre-heating and welding torches 76 and 78, respectively. The torches 76 and 78 are each provided with suitable regulating means in the form of valves 101 for controlling the mixture to the burners. The other end of the acetylene conduit 96 leads to the welding torch 66 by means of a branch pipe 102, and the welding torch is also provided with suitable valves 104 for controlling the mixture to the burner 93 of said welding torch. The acetylene tank 56 carried by the upper jaw 18 drains into the acetylene conduit 96 through a connector pipe 106 which extends through the upper jaw and is tapped into said conduit 96 by means of a T 108.

The burner 93 of welding torch 66 is positioned so as to act against and fuse a weld rod or wire 110 which is fed from a reel 112 supported on the upper surface of the jaw 18 by means of a bracket 114, said bracket being provided with a suitable spring brake 116. The weld rod 110 passes between feeding rollers 118 and said rod is adapted to be fed progressively by means of a hand-wheel 120 carried by a shaft 122 extending through one side wall 24 of jaw 18, the shaft 122 being connected to one of the feeding rollers 118.

In use, work such as tank sheets 2 are supported from a suitable base, not shown, and their edges which are to be welded together are arranged in the plane of the gap 22 and are clampingly held by means of the opposed rollers 42 and 44. The adjacent edges are pre-heated by means of the burners 80 and 88 of the pre-heating torch 76, the pre-heating being in advance of the welding and bringing the adjacent edges of the sheets 2 to a welding heat which is substantially at the point of fusion. The welding torch will function to deposit weld metal from the rod 110 between the adjacent edges of the sheets 2 and the weld metal is prevented from dropping by means of the refractory block 56. The yoke, as heretofore described, is movable on track 4 and it will be apparent that movement of the yoke to the left as shown in Fig. 1 will cause progressive welding of the joint between adjacent edges of the sheets 2 and following pre-heating of said edges. After the weld metal has been deposited between the adjacent edges of sheets 2 and welding of the joint effected, the annealing torch, which is preferably maintained to deliver a heat less intensive than that of either the pre-heating or welding torches, serves to retard the cooling and to effect a gradual cooling of the welded joint whereby to minimize or eliminate the disadvantages resulting from the rapid cooling of a welded joint which results in brittleness of the joint.

From the above description it is believed that the operation and method of the present invention will be fully apparent to those skilled in the art, it being obvious that the method includes first a pre-heating of the work at the area to be welded, it having been found unnecessary to heat the entire work, the pre-heating being followed by the deposition of weld metal by means of a torch which further heats the pre-heated area and brings the same to the exact welding temperature, and subsequent to these steps, the gradual reduction in temperature of the welded joint by means of the annealing torch. It is further believed that the construction of the machine of the present invention will be fully apparent to those skilled in the art, but it is to be understood that the drawings are for illustrative purposes only and various changes in the form and proportions of the device may be made within the scope of the appended claims without departing from the spirit of the invention.

What is claimed is:

1. A welding apparatus comprising means for holding the parts to be welded in adjacent relation, means supporting the apparatus to permit movement thereof relative to said parts, pre-heating means and welding means carried by the apparatus and adapted to act against said parts sequentially upon movement of the apparatus relative to the said parts, and heating means carried by the apparatus adapted to act against the welded joint of said parts immediately following the deposition of weld metal thereto to retard cooling of the joint to preserve the malleability thereof.

2. A welding apparatus comprising a yoke, means on the yoke for holding the parts to be welded in adjacent relation between the jaws of the yoke, pre-heating and annealing torches carried by the yoke and adapted to act against the parts to be welded, a weld rod adapted to be fed toward the parts at the joint to be welded, a welding torch intermediate the pre-heating and annealing torches and adapted to further heat the parts after pre-heating thereof and to fuse the weld rod, and means supporting said yoke to permit movement thereof relative to the parts to be welded whereby to effect sequentially a pre-heating of the parts to be welded, a further heating of said parts at the joint and the substantially simultaneous deposition of weld metal at the joint, and then a subsequent annealing of the welded joint.

3. A welding apparatus comprising a yoke including vertically spaced jaws defining a work receiving gap therebetween, opposed work engaging rollers carried by the yoke jaws adjacent the ends thereof, pre-heating means on the lower jaw for acting against the work on each side of the joint to be welded, annealing means on the lower jaw spaced from the pre-heating means and so arranged as to act directly on the welded joint, and heating means on the upper jaw arranged in the plane of the space between the pre-heating and annealing means.

4. A welding appartus comprising a yoke including vertically spaced jaws defining a work receiving gap therebetween, adjustable work engaging rollers carried by the jaws at the ends thereof, pre-heating torches on the lower jaw adapted to act against the work on each side of the joint to be formed, an annealing torch on the lower jaw spaced from the pre-heating torches and adapted to act directly against the welded joint, a fusible weld rod supported by the upper jaw, a welding torch carried by the upper jaw and adapted to fuse said weld rod and further adapted to additionally heat the work which has been pre-heated, said welding torch being arranged in the plane of the space between the pre-heating and annealing torches, inter-connected oxygen and acetylene tanks carried by the yoke and feeding the before mentioned torches, and means supporting the yoke to move the same relative to the work to effect sequentially a pre-heating of the work, then a further heating of the work and a fusing of the weld rod at the joint and then an annealing of the welded joint.

5. In a welding appartus, means for holding parts to be welded, said means being adjustable to take parts of varying size, means for effecting relative movement between the apparatus and said parts, pre-heating means, welding means and heating means supported by the apparatus adjacent the before-mentioned holding means and adapted to act sequentially against the parts during relative movement between the apparatus and said parts, said heating means being arranged closely adjacent the welding means whereby to act against the welded joint immediately after the welding to retard solidification of the joint, and a refractory block supported by the apparatus and adapted to contact with the under-surfaces of the work at the area being welded.

6. In a welding apparatus, upper and lower members adapted to be arranged on opposite surfaces of parts to be welded means for supporting said members, means supported by said members for engaging and holding the parts to be welded, pre-heating means supported by the lower member, welding means supported by the upper member, and heating means supported by the lower member and so arranged as to act against the parts immediately after action of the welding means to prevent rapid cooling of said parts.

In witness whereof I have hereunto set my hand.

JOHN M. ROHLFING.